(12) United States Patent
Sugita et al.

(10) Patent No.: US 11,488,744 B2
(45) Date of Patent: *Nov. 1, 2022

(54) MOLDED WIRE AND MOLDED CABLE, AND WIRE FOR MOLDED WIRE AND CABLE FOR MOLDED CABLE

(71) Applicant: Hitachi Metals, Ltd., Tokyo (JP)

(72) Inventors: Keisuke Sugita, Tokyo (JP); Akinari Nakayama, Tokyo (JP)

(73) Assignee: Hitachi Metals, Ltd., Tokyo (JP)

( * ) Notice: Subject to any disclaimer, the term of this patent is extended or adjusted under 35 U.S.C. 154(b) by 513 days.

This patent is subject to a terminal disclaimer.

(21) Appl. No.: 15/287,835

(22) Filed: Oct. 7, 2016

(65) Prior Publication Data

US 2017/0103828 A1    Apr. 13, 2017

(30) Foreign Application Priority Data

Oct. 7, 2015 (JP) .............................. JP2015-199758

(51) Int. Cl.
*H01B 7/02* (2006.01)
*H01B 3/30* (2006.01)
(Continued)

(52) U.S. Cl.
CPC ........... *H01B 7/0216* (2013.01); *H01B 3/302* (2013.01); *H01B 3/441* (2013.01); *H01B 7/282* (2013.01);
(Continued)

(58) Field of Classification Search
CPC . H01B 3/00; H01B 3/30; H01B 3/302; H01B 3/305; H01B 3/421; H01B 3/423;
(Continued)

(56) References Cited

U.S. PATENT DOCUMENTS 6,242,097 B1 * 6/2001 Nishiguchi ............. B32B 27/08
428/383
2011/0174518 A1 * 7/2011 Iwasaki .................. H01B 3/302
174/116

(Continued)

FOREIGN PATENT DOCUMENTS

CN        104497553 A  *  4/2015
EP           1559483 A1 *  8/2005 ............... B05D 3/12
(Continued)

OTHER PUBLICATIONS

Merriam-Webster definition on "composition", obtained on Feb. 2022.*

(Continued)

*Primary Examiner* — Holly Rickman
*Assistant Examiner* — Lisa Chau
(74) *Attorney, Agent, or Firm* — Meunier Carlin & Curfman LLC (57) ABSTRACT

A molded cable comprises a conductor, an insulation inner layer, an insulation outer layer, and a resin molded body. The insulation inner layer comprises a crosslinked ethylene resin composition and is provided an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 μm to 100 μm. The resin molded body coats an exposed end portion of the conductor and an end portion of the insulation outer layer at a side of the exposed end portion of the conductor. The resin molded body is fused to the insulation outer layer.

11 Claims, 6 Drawing Sheets

(51) Int. Cl.
  *H01B 7/282* (2006.01)
  *H01B 3/44* (2006.01)
  *H01B 7/29* (2006.01)
  *H01B 3/42* (2006.01)
(52) U.S. Cl.
  CPC .............. *H01B 7/292* (2013.01); *H01B 3/305* (2013.01); *H01B 3/423* (2013.01); *H01B 3/447* (2013.01); *Y02A 30/14* (2018.01)
(58) Field of Classification Search
  CPC .......... H01B 3/441; H01B 3/447; H01B 7/02; H01B 7/0208; H01B 7/0216; H01B 7/0225; H01B 7/0275; H01B 7/0291; H01B 7/08; H01B 7/282; H01B 7/292; H01B 11/002; B23B 2222/92; B23B 2228/105; B23B 27/148; B23C 5/207; B26D 1/0006; C23C 14/0021; C23C 14/0641; C23C 14/0652; C23C 14/0664; C23C 14/26; C23C 14/325; C23C 14/541; C23C 28/044; C23C 30/005; C08L 23/06; C08L 23/08; C08L 23/12; C08L 23/16; C08L 33/04; C08L 75/04; C08K 13/02; C08K 3/34; C08K 5/134; H01R 4/02; H01R 4/023; H01R 9/03; H01R 9/07; H01R 9/0707
  See application file for complete search history.

(56) References Cited

U.S. PATENT DOCUMENTS

2012/0292077 A1* 11/2012 Sugita .................. C08F 255/02
                                                    174/110 SR
2012/0318557 A1* 12/2012 Iwasaki ................ C08K 5/0025
                                                    174/113 C
2014/0182883 A1* 7/2014 Sugita .................... H01B 3/447
                                                    174/113 R

FOREIGN PATENT DOCUMENTS

| JP | H04253110 A | | 9/1992 |
|---|---|---|---|
| JP | 07238220 A | * | 9/1995 |
| JP | 10233124 A | * | 9/1998 |
| JP | 10269859 A | * | 10/1998 |
| JP | 10294023 A | * | 11/1998 |
| JP | 2007095439 A | * | 4/2007 |
| JP | 2007095439 A | | 4/2007 |
| JP | 3976840 B2 | * | 9/2007 |
| JP | 2014141650 A | | 8/2014 |

OTHER PUBLICATIONS

CN Office Action dated Feb. 11, 2019 in corresponding Chinese Patent Application No. 201610838895.5.
Notice of Reason(s) for Rejection dated Mar. 19, 2019 in the corresponding Japanese patent application No. 2015-199758.
Notice of Reasons for Refusal (machine translation), dated Nov. 5, 2020, from the Japanese Patent Office, Japanese Patent Application No. 2015-199758, 5 pages.
Notice of Reasons for Refusal (machine translation), dated Nov. 5, 2019, from the Japanese Patent Office, Japanese Patent Application No. 2015-199758, 5 pages.
CN Office Action dated Sep. 23, 2019 in corresponding Chinese Patent Application No. 201610838895.5.
Office Action dated Apr. 16, 2020 in the corresponding Chinese patent application No. 201610838895.5 and its full English translation (machine generated).

* cited by examiner

Prior Art

FIG.6

MOLDED WIRE AND MOLDED CABLE, AND WIRE FOR MOLDED WIRE AND CABLE FOR MOLDED CABLE

CROSS-REFERENCE TO RELATED APPLICATIONS

This application claims the benefit of Japanese Patent Application No. 2015-199758 filed on Oct. 7, 2015 with the Japan Patent Office, the disclosure of which is incorporated herein by reference.

BACKGROUND

The present disclosure relates to a molded wire and a molded cable, as well as a wire for a molded wire and a cable for a molded cable.

When machine parts, such as a sensor, are coupled to a cable via electrode terminals or electric circuits, coupling portions and peripheral areas thereof are generally coated with a resin for molding (i.e., molded) (hereinafter, the resin for molding is referred to as "molding resin").

Because the aforementioned machine parts, such as a sensor, are to be used in vehicles, robots, electronic devices, etc., that are required to be highly reliable, air tightness between the resin molded body and the cable is one of very important properties. For this reason, to form a sheath of the cable, it is necessary to use a material having excellent adhesiveness to a molding resin.

Figure 5:
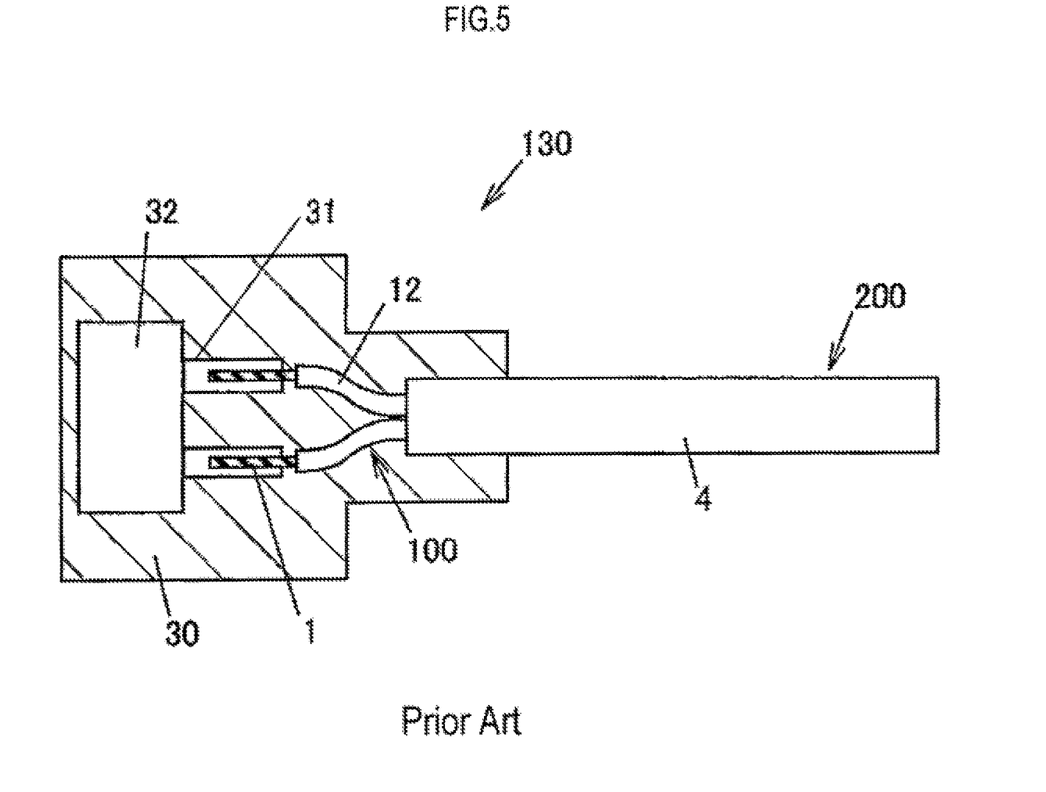
FIG. 5 is a cross-sectional view showing a molded cable in the related art.

Examples of a structure of the above-described molded cable include a molded cable shown in FIG. 5.

A molded cable 130 has the following structure: an end portion of a sheath 4 of a cable 200 as well as end portions of insulators 12 of wires 100 are removed so as to expose conductors 1; the exposed conductors 1 are coupled to electrode terminals 31 of a sensor 32, so that the cable 200 is coupled the sensor 32. A resin molded body 30 is formed by resin molding such that the sensor 32 and terminal portions of the cable are embedded in a resin. In the resin molded body 30, the sensor 32 and the terminal portions of the cable are coated with the resin, and this resin protects the end portion of the sheath 4.

For the aforementioned usage, thermoplastic polyurethane is generally used as a material for a sheath of a cable; a polyamide resin and a polybutylene terephthalate resin are generally used as a molding resin (see, Japanese Unexamined Patent Application Publication No. 2007-95439).

Figure 3:
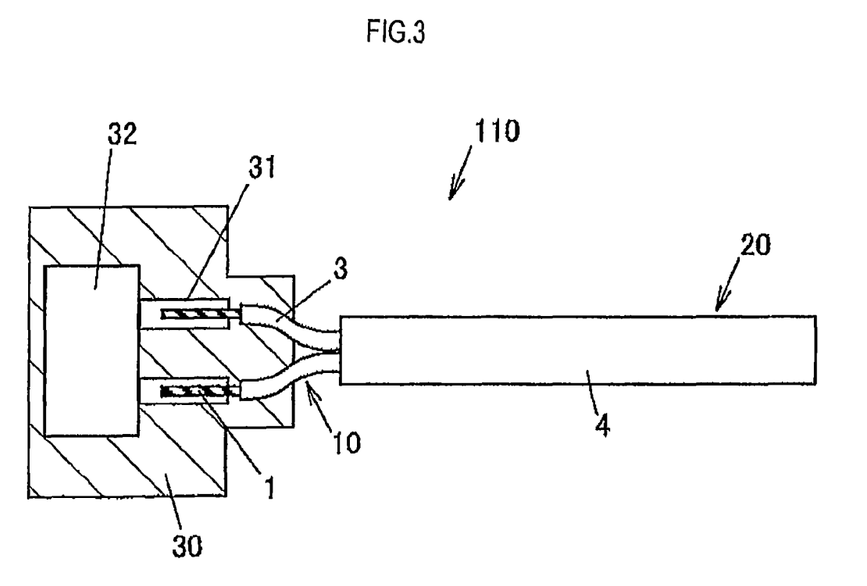
FIG. 3 is a cross-sectional view showing one example of the molded cable of the embodiment of the present disclosure.

In order to achieve downsizing of the machine parts, such as a sensor, and improve easiness of cable-routing in devices, the following structure such as shown in FIG. 3 has been newly created: not an end of a sheath of a cable, but ends of insulations of a wire are fused with a molding resin.

In the structure in FIG. 3, a volume of the molding resin can be reduced and therefore, the device can be downsized compared with the conventional one. Moreover, in the conventional structure in FIG. 5, protruded from the resin molded body is a thick cable, whereas in FIG. 3, protruded from the resin molded body are thin insulation wires. Therefore, the structure in FIG. 3 can reduce a bending radius in the vicinity of the molded area, resulting in improved easiness of cable-routing (i.e., the necessary space can be reduced).

SUMMARY

In the structure in FIG. 3, if a commonly-used crosslinked polyethylene resin is used for the insulation, adhesion between the insulation and the molding resin is weak. Thus, sufficient air tightness cannot be achieved. In this regard, it is considered to use, as the insulation, thermoplastic polyurethane having excellent adhesiveness to the molding resin.

However, in general, because thermoplastic polyurethane has a strong adhesion, the wires adhere to each other. This causes a problem of reduced ease of handling (work efficiency) at the time of taking the wire, which had been wound on a bobbin, from the bobbin or at the time of twisting the wires. Moreover, another problem is that because a adhesion force of thermoplastic polyurethane to the conductor is strong, peel-off work at the time of processing cable terminals becomes difficult. Furthermore, if thermoplastic polyurethane is crosslinked to have heat resistance, adhesion to a molding resin decreases, as in the case of polyethylene resin; consequently, a problem arises in which sufficient air tightness cannot be achieved.

Moreover, recently, wires and cables have been required to have much more excellent heat resistance. In view of this, as a coating material for wires and cables, a resin composition crosslinked by, for example, irradiation with an electron beam has been employed. Also, wires and cables have been required to have an excellent mechanical strength (tensile elongation).

In one aspect of the present disclosure, it is desirable to provide a molded wire and a molded cable that are excellent in ease of handling (work efficiency), terminal processability, air tightness, heat resistance, and mechanical strength (tensile elongation).

The present disclosure provides a molded wire and a molded cable, and also a wire for a molded wire and a cable for a molded cable, which are described below.

A molded wire in one aspect of the present disclosure comprises a conductor, an insulation inner layer, an insulation outer layer, and a resin molded body. The insulation inner layer comprises a crosslinked ethylene resin composition and is provided on an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 µm to 100 µm. The resin molded body coats an exposed end portion of the conductor and an end portion of the insulation outer layer at a side of the exposed end portion of the conductor. The resin molded body is fused to the insulation outer layer. Gel fraction of the crosslinked ethylene resin composition is 45% or more, and gel fraction of the crosslinked thermoplastic polyurethane composition is 71% or less.

In the molded wire, the gel fraction of the crosslinked ethylene resin composition may be 50% or more, and the gel fraction of the crosslinked thermoplastic polyurethane composition may be 70% or less.

In the molded wire, the resin molded body may comprise polyamide resin or polybutylene terephthalate resin.

A molded cable in another aspect of the present disclosure comprises a conductor, an insulation inner layer, an insulation outer layer, a jacket, and a resin molded body. The insulation inner layer comprises a crosslinked ethylene resin composition and is provided on an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 µm to 100 µm. The jacket is provided on an outer circumference of the insulation outer layer. The resin molded body coats an exposed end portion of the conductor and an end portion of the insulation outer layer at a side of the exposed end portion of the conductor. The resin molded body is fused to the insulation outer layer.

In the molded cable, gel fraction of the crosslinked ethylene resin composition may be 50% or more, and gel fraction of the crosslinked thermoplastic polyurethane composition may be 70% or less.

In the molded cable, the resin molded body may comprise polyamide resin or polybutylene terephthalate resin.

A wire for a molded wire in still another aspect of the present disclosure comprises a conductor, an insulation inner layer, and an insulation outer layer. The insulation inner layer comprises a crosslinked ethylene resin composition and is provided on an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 μm to 100 μm. Gel fraction of the crosslinked ethylene resin composition is 45% or more, and gel fraction of the crosslinked thermoplastic polyurethane composition is 71% or less.

A cable for a molded cable in yet another aspect of the present disclosure comprises a conductor, an insulation inner layer, an insulation outer layer, and a jacket. The insulation inner layer comprises a crosslinked ethylene resin composition and is provided on an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 μm to 100 μm. The jacket is provided on an outer circumference of the insulation outer layer. Gel fraction of the crosslinked ethylene resin composition is 45% or more, and gel fraction of the crosslinked thermoplastic polyurethane composition is 71% or less.

According to the present disclosure, it is possible to provide a molded wire and a molded cable that are excellent in ease of handling (work efficiency), terminal processability, air tightness, heat resistance, and mechanical strength (tensile elongation).

BRIEF DESCRIPTION OF THE DRAWINGS

The present disclosure will now be described by way of example with reference to the accompanying drawings, in which.

DETAILED DESCRIPTION OF THE PREFERRED EMBODIMENTS

[Molded Wire and Molded Cable]

A molded wire according to an embodiment of the present disclosure comprises a conductor, an insulation inner layer, an insulation outer layer, and a resin molded body. The insulation inner layer comprises a crosslinked ethylene resin composition and is provided on an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 μm to 100 μm. The resin molded body coats an exposed end portion of the conductor and an end portion of the insulation outer layer at a side of the exposed end portion of the conductor. The resin molded body is fused to the insulation outer layer. An insulated electric wire comprising the above-described configuration, except for the resin molded body, is a wire for a molded wire of the embodiment of the present disclosure.

A molded cable according to the embodiment of the present disclosure comprises a conductor, an insulation inner layer, an insulation outer layer, a jacket, and a resin molded body. The insulation inner layer comprises a crosslinked ethylene resin composition and is provided on an outer circumference of the conductor. The insulation outer layer comprises a crosslinked thermoplastic polyurethane composition and is provided on an outer circumference of the insulation inner layer. Arithmetic average roughness (Ra) of a surface of the insulation outer layer is 5 μm to 100 μm. The jacket is provided on an outer circumference of the insulation outer layer. The resin molded body coats an exposed end portion of the conductor and an end portion of the insulation outer layer at a side of the exposed end portion of the conductor. The resin molded body is fused to the insulation outer layer. A cable comprising the above-described configuration, except for the resin molded body, is a cable for a molded cable of the embodiment of the present disclosure.

An explanation will be given with respect to a wire and a cable, which respectively forms a molded wire and a molded cable of an embodiment of the present disclosure.

Figure 1:
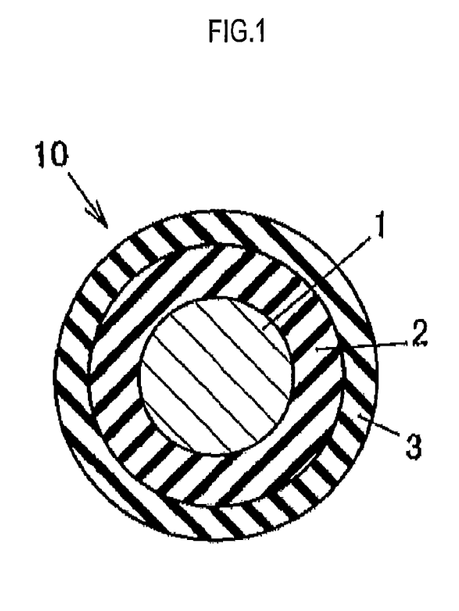
FIG. 1 is a cross-sectional view showing one example of a wire that is to be used for a molded wire and a molded cable of an embodiment of the present disclosure.

FIG. 1 shows a wire 10 to be used for the molded wire and the molded cable of the embodiment of the present disclosure. The wire 10 comprises a conductor 1, an insulation inner layer 2, and an insulation outer layer 3. The insulation inner layer 2 comprises a crosslinked ethylene resin composition and is provided on an outer circumference of the conductor 1. The insulation outer layer 3 comprises a crosslinked thermoplastic polyurethane composition and is provided on an outer circumference of the insulation inner layer 2; arithmetic average roughness (Ra) of a surface of the insulation outer layer 3 is 5 μm to 100 μm. Although it is preferable that the insulation layers are formed of the aforementioned two layers only, other insulation layers may be provided to the extent that effects of the present disclosure can be exhibited.

Figure 2:
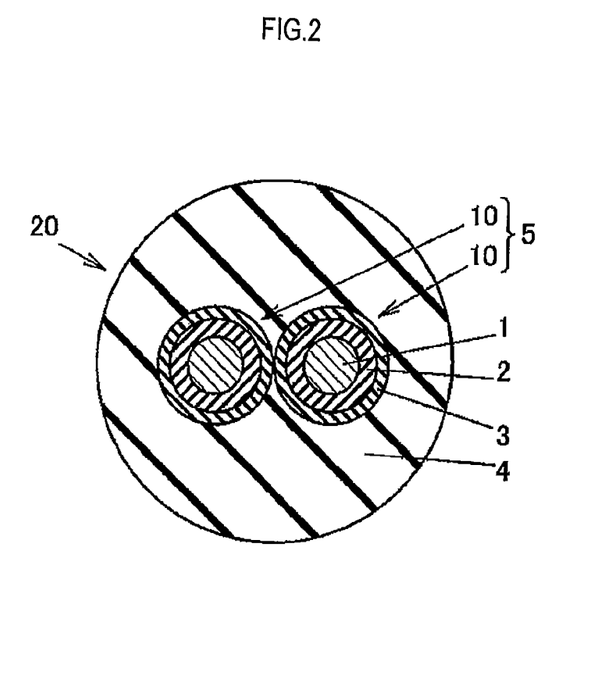
FIG. 2 is a cross-sectional view showing one example of a cable that is to be used in the molded cable of the embodiment of the present disclosure.

FIG. 2 shows a cable 20 to be used for the molded cable of the embodiment of the present disclosure. The cable 20 comprises a stranded multi-core wire 5 formed by twisting two pieces of the wire 10, and a sheath 4 provided on an outer circumference of the stranded multi-core wire 5. The number of the wires to be twisted to form the stranded multi-core wire 5 is not limited to two, and may be more than three.

Any known materials can be used as a material of the conductor 1, and examples of such materials include copper, annealed copper, silver, aluminum. In order to improve heat resistance, surfaces of these materials may be plated with tin, nickel, silver, or gold.

Examples of ethylene resin to be used in the ethylene resin composition forming the insulation inner layer 2 include high-density polyethylene, linear low-density polyethylene, low-density polyethylene, ultralow-density polyethylene, ethylene-butene-1 copolymer, ethylene-hexene-1 copolymer, ethylene-octene-1 copolymer, ethylene-vinyl acetate copolymer, ethylene-methyl acrylate copolymer, ethylene-ethyl acrylate copolymer, ethylene-methyl methacrylate copolymer, ethylene-butyl acrylate copolymer, and ethylene-butene-hexane terpolymer; these can be used alone or by blending two or more of them. A melt index of the ethylene resin, and contents of copolymer components in the ethylene resin, other than ethylene, are not specifically limited.

Among the above-listed ethylene resins, it is preferable to use ethylene-vinyl acetate copolymer, ethylene-methyl acrylate copolymer, and ethylene-ethyl acrylate copolymer in view of adhesion to thermoplastic polyurethane that is to be used in the insulation outer layer 3.

Use of the ethylene resin composition as the insulation inner layer 2 can inhibit adhesion to the conductor 1, thereby making peel-off work at the time of processing cable terminals easier. That is, terminal processability can be improved. In addition, because the ethylene resin composition has been crosslinked, excellent heat resistance can be achieved.

As thermoplastic polyurethane to be used in the thermoplastic polyurethane composition forming the insulation outer layer 3, polyester-based polyurethane (e.g., adipate-based, caprolactone-based, and polycarbonate-based polyurethane), and polyether-based polyurethane can be used. Specifically, in view of moist-heat resistance, it is preferable to use polyether-based polyurethane. In terms of hardness, there is no limitation, and any thermoplastic polyurethane can be used.

Appropriate roughening of the surface of the thermoplastic polyurethane of the insulation outer layer 3 causes reduction in the adhesion, thereby improving ease of handling of the wire. Moreover, when the thermoplastic polyurethane is crosslinked, air tightness with respect to the resin molded body can be maintained.

If necessary, additives may be added to the aforementioned ethylene resin and thermoplastic polyurethane; such additives include a processing aid, a flame retardant, a flame retardant aid, a crosslinking agent, a crosslinking aid, an antioxidant, an ultraviolet absorber, a copper inhibitor, a lubricant, an inorganic filler, an adhesion-imparting agent, a stabilizer, carbon black, a colorant, etc.

A matting agent can be added to the thermoplastic polyurethane so as to obtain the insulation outer layer 3, the surface of which is roughened. Examples of the matting agent include inorganic compound powers, such as calcium carbonate, talc, mica, and silica, and crosslinked polymer particles, such as polystyrene and polyurethane. There is no particular limitation on the matting agent with which a specified effect can be obtained. An addition amount of the matting agent is, for example, 1 parts by mass to 5 parts by mass, relative to 100 parts by mass of the thermoplastic polyurethane.

The ethylene resin composition and the thermoplastic polyurethane composition are extruded, onto the conductor 1, as the insulation inner layer 2 and the insulation outer layer 3, respectively, so as to coat the conductor 1; consequently, the wire 10 of the embodiment of the present disclosure can be obtained. As a method of the extrusion coating, any known method of extrusion coating can be used. Examples of such methods include a method of firstly coating the insulation inner layer 2 and then, as a different step, coating the insulation outer layer 3, and a method of coating at one step by means of two extruders, each provided with an extrusion head for simultaneous extrusion of two layers. Thicknesses of the insulation inner layer 2 and the insulation outer layer 3, and a ratio of the thickness of the insulation inner layer 2 to that of the insulation outer layer 3 are not limited, and may be specified in any manner.

To roughen the surface of the insulation outer layer 3 by changing an extrusion condition, an effective method is to increase shearing stress to be applied to the material. Such methods are, for example, a method of narrowing a flow path of the material by changing sizes and positional configurations of the extruder and dies and nipples thereof, and a method of decreasing an extrusion temperature or increasing an unwinding speed of the wire.

The arithmetic average roughness (Ra) of the surface of the insulation outer layer 3 is adjusted to be 5 µm to 100 µm. If the arithmetic average roughness is less than 5 µm, smoothness of the surface is increased. In this case, because the contact area is increased, adhesion between the wires is increased. In addition, air tightness between the molding resin and the insulation outer layer 3 is decreased. On the other hand, if the arithmetic average roughness is greater than 100 µm, the appearance of the extruded material greatly deteriorates and elongation of the wire (i.e., tensile elongation) decreases.

In the embodiment of the present disclosure, the insulation inner layer 2 and the insulation outer layer 3 need to be crosslinked. The preferred crosslinking method is crosslinking by irradiation with an electron beam. It is preferable to carry out the electron beam irradiation after coating the insulation outer layer 3, so that the inner and outer layers are crosslinked simultaneously. This is because, the insulation inner layer 2 and the insulation outer layer 3 are co-crosslinked at the interface thereof, resulting in enhanced adhesion between these layers.

Although there is no specific limitation on an absorbed dose of the electron beam, it is necessary to limit gel fractions such that a gel fraction of the ethylene resin composition to be used in the insulation inner layer 2 is 45% or more, and that a gel fraction of the thermoplastic polyurethane composition to be used in the insulation outer layer 3 is 71% or less. If the gel fraction of the insulation inner layer 2 is less than 45%, sufficient heat resistance cannot be achieved, which may cause problems, such as melting. Moreover, if the gel fraction of the insulation outer layer 3 exceeds 71%, adhesion to the molding resin is reduced, lowering air tightness.

The gel fraction of the ethylene resin composition to be used in the insulation inner layer 2 is preferably 50% or more, more preferably 60% or more, and further preferably 70% or more. An upper limit of the gel fraction of the ethylene resin composition to be used in the insulation inner layer 2 is not specifically limited; however, the upper limit is preferably 95% or less, more preferably 90% or less, and still more preferably 85% or less.

The gel fraction of the thermoplastic polyurethane composition to be used in the insulation outer layer 3 is preferably 70% or less, more preferably 68% or less, and still more preferably 65% or less. A lower limit of the gel fraction of the thermoplastic polyurethane composition to be used in the insulation outer layer 3 is not specifically limited; however, the lower limit is preferably 20% or more, more preferably 25% or more, and still more preferably 30% or more. The gel fraction can be obtained by, for example, a method described in the later-explained examples.

The sheath 4 can be provided by extrusion coating. As a material of the sheath 4, general purpose materials, such as thermoplastic polyurethane or polyolefin-based material, can be used; these materials may be crosslinked so as to have heat resistance.

A jacket of the cable to be used for the molded cable of the embodiment of the present disclosure is not limited to the aforementioned sheath 4, and may be a corrugated tube 6 shown in FIG. 4, which will be described later. As a material of the corrugated tube 6, general-purpose materials, such as polypropylene and polyamide, can be used; these materials are preferably flame-retarded.

Next, the resin molded body that forms the molded wire and the molded cable of the embodiment of the present disclosure will be described.

Because the resin molded body is a common part for both the molded wire and the molded cable of the embodiment of the present disclosure, the resin molded body will be described, by way of example, in the case of the molded cable.

As shown in FIG. 3, a molded cable 110 of the embodiment of the present disclosure comprises the above-described cable 20 and a resin molded body 30. The resin molded body 30 is fused to the insulation outer layer 3 to cover an exposed end portion of the conductor 1 and an end portion of the insulation outer layer 3 at the side of the expose end portion of the conductor 1.

The molded cable 110 is produced in the following steps.

The sheath 4 provided at a terminal of the cable 20 is cut and removed to expose an end of the wire 10. The insulation inner layer 2 and the insulation outer layer 3 of the exposed end of the wire 10 are cut and removed to expose an end of the conductor 1. Then, the conductor 1 is coupled to an electrode terminal 31 of the sensor 32. This coupled portion, the sensor 32, and the end portion of the insulation outer layer 3 are coated with a molding resin by injection molding, thereby forming the resin molded body 30. In this way, the molded cable 110 (molded article) can be obtained. The resin molded body 30 is fused, not to the sheath 4 of the cable 20, but to the insulation outer layer 3. Instead of the sensor 32, other machine parts may be employed.

In the case of the molded wire of the embodiment of the present disclosure, not the cable 20, but the wire 10 is used. Accordingly, production of the molded wire of the embodiment of the present disclosure is different from that of the molded cable, because the molded wire does not require the cut-and-remove step of the sheath 4.

As the molding resin to be used for the resin molded body 30, polyamide resin or polybutylene terephthalate resin is preferable, and it is desirable that these resins are reinforced with glass fiber.

Figure 4:
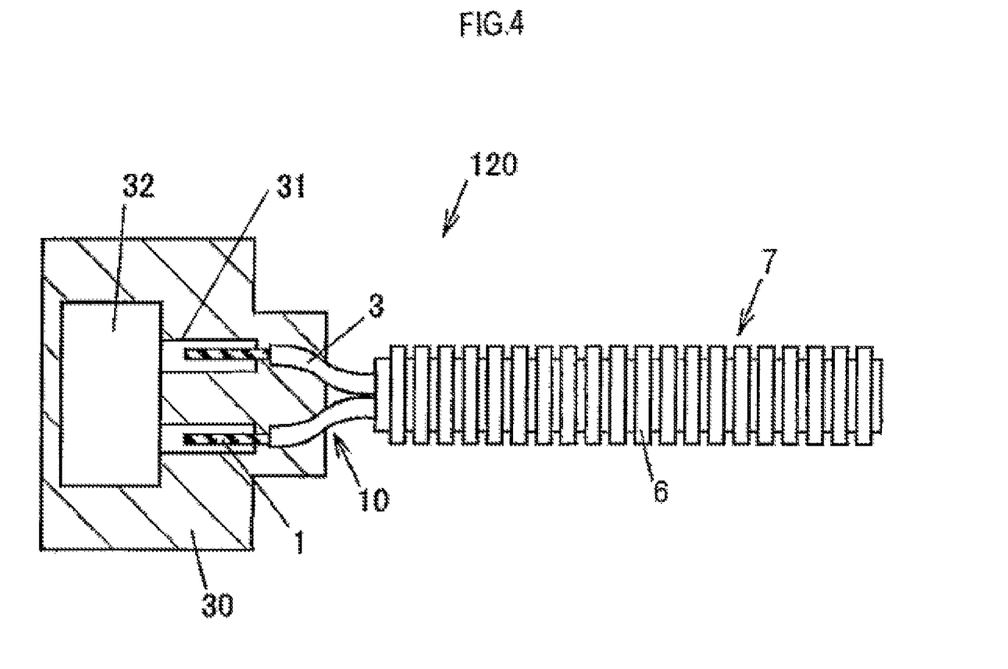
FIG. 4 is a cross-sectional view showing another example of the molded cable of the embodiment of the present disclosure.

FIG. 4 shows another example of the molded cable of the embodiment of the present disclosure.

A molded cable 120 shown in FIG. 4 is different from the molded cable 110 shown in FIG. 3 with respect to the following point: instead of the cable 20, a corrugated cable 7 is used. The corrugated cable 7 is formed such that instead of the sheath 4, the corrugated tube 6 is coated around the stranded multi-core wire 5.

As a method for protecting a not-molded portion of the wire, a method of coating such portion of the wire with the sheath 4, a method of routing the wire inside the corrugated tube 6, and a method of winding a protective tape around the wire can be adopted.

The molded wire and the molded cable of the embodiment of the present disclosure is preferably used as a sensor cable, for example, for automobiles, robots, electronic devices, etc.

EXAMPLES

Hereinafter, the present disclosure will be described in further details based on examples; however, the present disclosure is not limited to these examples.

(Production of Wire)

A copper conductor obtained by twisting seven wire strands, each having a diameter of 0.26 mm, was extrusion-coated with compositions shown in the examples and comparative examples in Table 1 to form an insulation inner layer and an insulation outer layer. The insulation inner layer and the insulation outer layer were formed by means of a 40-mm single screw extruder (L/D=24) and a 24-mm single screw extruder (L/D=20), respectively. The extrusion coating of the copper conductor was carried out such that the inner layer has a coating thickness of 0.20 mm, that the outer layer has a coating thickness of 0.15 mm, and that an outer diameter of the wire is 1.5 mm. Consequently, a wire was produced. An extrusion temperature of the inner layer was 200° C., and an extrusion condition of the outer layer was as shown in Table 1. The obtained wire was exposed to electron beam irradiation at an absorbed dose shown in Table 1, and the inner and outer layers were simultaneously crosslinked. The finished wire was wound on a bobbin having a barrel diameter of 300 mm. Each of the wires has a total length of 300 m.

(Measurement and Evaluation of Wire)

The produced wire was measured and evaluated by the following test methods. Results of the measurement and the evaluation are shown in Table 1.

<Arithmetic Average Roughness of Surface of Insulation Outer Layer>

Arithmetic average roughness (Ra) of the surface of the insulation outer layer was measured in a non-contact manner by means of a laser microscope.

<Gel Fraction of Insulation>

Gel fraction, which is an index of degree of crosslinking, of the insulation inner layer and gel fraction of the insulation outer layer of the wire were measured. The inner layer and the outer layer were cut off by a razor or the like to obtain samples. The sample of the outer layer was extracted with tetrahydrofuran at a temperature of 65° C. for 18 hours, and the sample of the inner layer was extracted with xylene at a temperature of 120° C. for 24 hours. After the extraction, the extracts were dried. The gel fraction was calculated by the following formula:

$$\{(\text{Mass of sample after being extracted and dried (=Mass of remaining gel)})/(\text{Mass of sample before extraction})\} \times 100 \, (\%)$$

<Adhesiveness>

The wires that had been wound on the bobbin were left for one week. Then, when the wires were taken from the bobbin, it was visually observed whether adhesion was observed between the wires.

<Terminal Processability>

The wire was cut to have a 100-mm length piece. From the cut piece of the wire, the insulation was stripped off, except for its length of 25 mm. The exposed portion of the conductor was fixed, and a force for pulling off the remaining insulation from the conductor was measured. The wires having a measured value of 35 N or below is rated as "Pass".

<Heat Resistance>

The wire was wound around a 2.3-mm-diameter cylinder in three turns, and then heated in a thermostatic chamber at a temperature of 170° C. for 6 hours. After the wire was taken out from the thermostatic chamber, the wire was left for cooling down to room temperature. Thereafter, the wires having an appearance with no melted portions and no cracks are evaluated as "Pass".

<Tensile Elongation>

The insulation that was obtained by pulling off the conductor from the wire was pulled at a rate of 200 mm/min, and its elongation was measured. The wires having a measured value of 100% or more is rated as "Pass".

(Production and Evaluation of Molded Wire)

A molded wire was produced as described below, and air tightness of the molded wire was evaluated by the following method. Results of the evaluation are shown in Table 1.

The insulation outer layer of one end of the wire 10 was coated by injection molding with polyamide (Glass Fiber: 30% by mass, Product Name: Reny 1002F, produced by Mitsubishi Engineering-Plastics Corp.; "Reny" is a registered trademark) or polybutylene terephthalate (Glass Fiber: 30% by mass, Product Name: NOVADURAN 5010G30X4, produced by Mitsubishi Engineering-Plastics Corp.; "NOVADURAN" is a registered trademark), thereby forming a molded body (diameter: 15 mm, length: 20 mm, and inserted length of the wire: 15 mm), which is a resin molded body 30. A terminal of wire 10 was sealed with the resin molded body 30, and this wire 10 was used as a sample.

Figure 6:
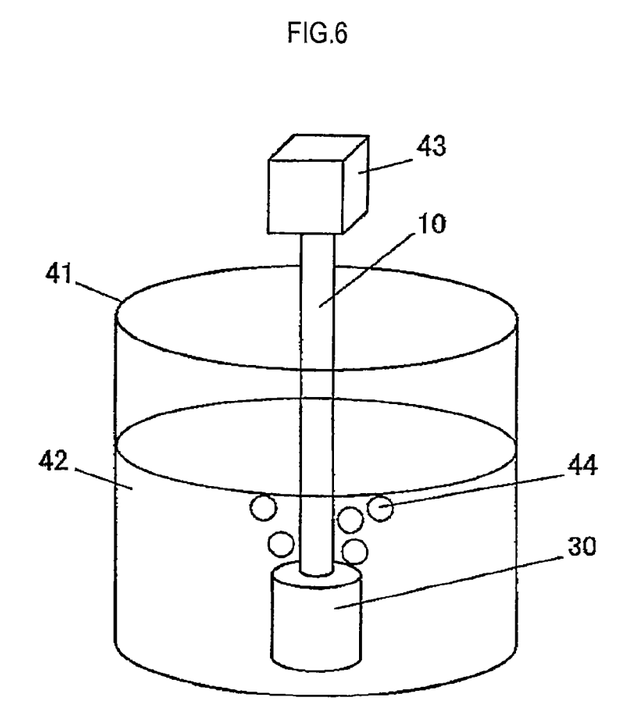
FIG. 6 is a schematic view of a test device for testing air tightness between the wire of the molded wire and the resin molded body in examples and comparative examples.

The obtained sample underwent a heat shock test for 200 cycles; in each cycle, the sample is held at a temperature of −40° C. for 30 minutes and a temperature of 125° C. for 30 minutes. Thereafter, as shown in FIG. 6, while the sample was held in a state where the resin molded body 30 was immersed in water 42 in a water bath 41, compressed air was sent to the terminal of the wire 10 from an air-supply device 43 at 30 kPa for 30 seconds. During this, the sample with which no air bubble 44 emerges from between the resin molded body 30 and the wire 10 is rated as "Pass". The samples that were rated as "Pass" further underwent the heat shock test for another 200 cycles, repeatedly, up to 2000 cycles in total. The samples with which the total number of cycles is 1000 cycles or more are rated as "Pass".

TABLE 1

| | Item | | Examples 1 | 2 | 3 | 4 | 5 | 6 | 7 |
|---|---|---|---|---|---|---|---|---|---|
| Inner Layer | Ethylene vinyl acetate copolymer *1 (part by mass) | | 100 | 100 | 100 | 100 | 100 | 100 | 100 |
| | Ethylene-methyl acrylate copolymer *2 (part by mass) | | — | — | — | — | — | — | — |
| | Ethylene-ethyl acrylate copolymer *3 (part by mass) | | — | — | — | — | — | — | — |
| | Thermoplastic polyurethane *4 (part by mass) | | — | — | — | — | — | — | — |
| | Antioxidant *5 (part by mass) | | 0.2 | 0.2 | 0.2 | 0.2 | 0.2 | 0.2 | 0.2 |
| | Copper inhibitor *6 (part by mass) | | 0.2 | 0.2 | 0.2 | 0.2 | 0.2 | 0.2 | 0.2 |
| Outer Layer | Thermoplastic polyurethane *4 (part by mass) | | 100 | 100 | 100 | 100 | 100 | 100 | 100 |
| | Matting agent *7 (part by mass) | | — | — | — | — | 3 | — | — |
| Conditions | Extrusion temperature of insulation outer layer (° C.) | | 210 | 210 | 200 | 190 | 210 | 210 | 210 |
| | Pulling rate of wires (m/min) | | 10 | 20 | 15 | 10 | 10 | 10 | 10 |
| | Electron-beam-irradiation absorbed dose of insulation layers (sum of the inner and outer layers) (kGy) | | 150 | 150 | 150 | 150 | 150 | 10 | 250 |
| Proportion | Arithmetic average roughness (Ra) of outer layer surface (μm) | 5 or above, and 100 or below | 5.1 | 24.3 | 66.2 | 98.5 | 46.7 | 5.1 | 5.1 |
| | Gel fraction of inner layer (%) | 45 or above | 82 | 82 | 80 | 81 | 84 | 51 | 90 |
| | Gel fraction of outer layer (%) | 71 or below | 62 | 58 | 59 | 55 | 61 | 32 | 71 |
| Evaluation Results | Presence (+)/absence (−) of adhesion | Absence (−) | − | − | − | − | − | − | − |
| | Terminal processability Pull-off force (N) | 35 or below | 28 | 28 | 27 | 26 | 27 | 34 | 23 |
| | Heat resistance test | No melting and No Crack (−) | − | − | − | − | − | − | − |
| | Tensile elongation (%) | 100 or above | 380 | 370 | 260 | 110 | 330 | 460 | 220 |
| | Air tightness, Number of cycles (times) | Polyamide 1000 or above | 1400 | 1600 | 1800 | 2000 | 1800 | 1600 | 1000 |
| | | Polybutylene terephthalate 1000 or above | 1200 | 1200 | 1600 | 2000 | 1400 | 1400 | 1000 |

| | Item | | Examples 8 | 9 | Comparative Examples 1 | 2 | 3 | 4 |
|---|---|---|---|---|---|---|---|---|
| Inner Layer | Ethylene vinyl acetate copolymer *1 (part by mass) | | — | — | — | 100 | 100 | 100 |
| | Ethylene-methyl acrylate copolymer *2 (part by mass) | | 100 | — | — | — | — | — |
| | Ethylene-ethyl acrylate copolymer *3 (part by mass) | | — | 100 | — | — | — | — |
| | Thermoplastic polyurethane *4 (part by mass) | | — | — | 100 | — | — | — |
| | Antioxidant *5 (part by mass) | | 0.2 | 0.2 | 0.2 | 0.2 | 0.2 | 0.2 |
| | Copper inhibitor *6 (part by mass) | | 0.2 | 0.2 | 0.2 | 0.2 | 0.2 | 0.2 |
| Outer Layer | Thermoplastic polyurethane *4 (part by mass) | | 100 | 100 | 100 | 100 | 100 | 100 |
| | Matting agent *7 (part by mass) | | — | — | — | — | — | — |
| Conditions | Extrusion temperature of insulation outer layer (° C.) | | 190 | 210 | 210 | 210 | 190 | 210 |
| | Pulling rate of wires (m/min) | | 10 | 20 | 10 | 5 | 12 | 10 |
| | Electron-beam-irradiation absorbed dose of insulation layers (sum of the inner and outer layers) (kGy) | | 150 | 150 | 150 | 150 | 150 | 0 |
| Proportion | Arithmetic average roughness (Ra) of outer layer surface (μm) | 5 or above, and 100 or below | 97.5 | 23.5 | 5.3 | 0.4 | 101.2 | 5.1 |
| | Gel fraction of inner layer (%) | 45 or above | 78 | 74 | 60 | 80 | 83 | 0 |
| | Gel fraction of outer layer (%) | 71 or below | 59 | 59 | 62 | 55 | 57 | 0 |

TABLE 1-continued

| Evaluation Results | Presence (+)/absence (−) of adhesion | Absence (−) | − | − | − | + | − | − |
|---|---|---|---|---|---|---|---|---|
| | Terminal processability Pull-off force (N) | 35 or below | 24 | 33 | 38 | 28 | 28 | 32 |
| | Heat resistance test | No melting and No Crack (−) | − | − | − | − | − | + |
| | Tensile elongation (%) | 100 or above | 110 | 360 | 380 | 400 | 80 | 450 |
| | Air tightness, Number of cycles (times) Polyamide | 1000 or above | 2000 | 1600 | 1400 | 800 | 2000 | 1600 |
| | Polybutylene terephthalate | 1000 or above | 2000 | 1200 | 1200 | 600 | 2000 | 1000 |

*1 Evaflex V5274, produced by Du Pont-Mitsui Polychemicals Co., Ltd. "Evaflex" is a registered trademark. (Content of vinyl acetate: 17% by mass; MI: 0.8)
*2 Elvaloy 1125AC, produced by Du Pont-Mitsui Polychemicals Co., Ltd. "Elvaloy" is a registered trademark. (Content of methyl acrylate: 25% by mass; MI: 0.4)
*3 REXPEARL A1150, produced by Japan Polyethylene Corp. "REXPEARL" is a registered trademark. (Content of ethyl acrylate: 15% by mass; MI: 0.8)
*4 Elastollan ETS90 (ether based) produced by BASF Japan Ltd. "Elastollan" is a registered trademark.
*5 Irganox 1010, produced by BASF Japan Ltd. "Irganox" is a registered trademark.
*6 Irganox MD1024, produced by BASF Japan Ltd. "Irganox" is a registered trademark.
*7 Elastollan masterbatch ST, produced by BASF Japan Ltd. "Elastollan" is a registered trademark.

In Examples 1 to 9, no adhesion was observed between the wires. The wires have excellent terminal processability. In terms of heat resistance, tensile elongation, and air tightness of the molded wire, the target values were satisfied. However, as for Embodiment 7 in which the absorbed dose of electron beam was higher than that in Embodiment 1, adhesion to the molding resin decreased and thus, a decreasing tendency of air tightness was observed.

In Comparative Example 1, the thermoplastic polyurethane was used in both the inner and outer layers and therefore, terminal processability was rated as "Fail".

In Comparative Example 2, the arithmetic average roughness of the surface of the outer layer was smaller than the specified value. Thus, adhesion between the wires were observed, and air tightness was ranked as "Fail".

In Comparative Example 3, the arithmetic average roughness of the surface of the outer layer was greater than the specified value. Thus, tensile elongation was ranked as "Fail".

In Comparative Example 4, because both of the inner and outer layers were not crosslinked, melting occurred during the heat resistance test.

As described above, according to the present disclosure, a molded wire that is formed by directly coating a molding resin to the insulation outer layer of the wire can have excellent air tightness. Moreover, the wire is excellent in ease of handling, terminal processability, tensile elongation, and heat resistance. Therefore, industrial usability of such a wire is considered as very high.

It is to be noted that the present disclosure is not limited to the above-described modes and embodiment and that can be carried out in various modes.

What is claimed is:

1. A molded cable comprising:
a conductor;
an insulation inner layer that comprises a crosslinked ethylene resin composition and that is provided directly onto an outer circumference of the conductor;
an insulation outer layer that consists of a crosslinked thermoplastic polyurethane formed by crosslinking a resin consisting of polyurethane, and that is provided on an outer circumference of the insulation inner layer, wherein an arithmetic average roughness (Ra) of a surface of the insulation outer layer is 5 μm to 100 μm inclusive;
a resin molded body that coats an exposed end portion of the conductor and an end portion of the insulation outer layer at a side of the exposed end portion of the conductor and that is fused to the surface of the insulation outer layer, wherein the resin molded body comprises polyamide resin or polybutylene terephthalate resin;
and
wherein gel fraction of the crosslinked ethylene resin composition is 45% or more, and gel fraction of the crosslinked thermoplastic polyurethane is between 55% and 71% inclusive.

2. The molded cable according to claim 1, wherein the gel fraction of the crosslinked ethylene resin composition is 50% or more.

3. The molded cable according to claim 1, further comprising:
a sheath provided on an outer circumference of the insulation outer layer; and
wherein the resin molded body does not cover any portion of the sheath.

4. The molded cable of claim 1, wherein the insulation inner layer and the insulation outer layer are co-crosslinked.

5. A molded cable comprising:
a conductor,
an insulation inner layer located directly on an outer surface of the conductor,
an insulation outer layer located on an outer surface of the insulation inner layer,
a resin molded body comprising polyamide resin or polybutylene terephthalate resin, wherein the resin molded body is fused to an outer surface of the insulation outer layer,
and
a sheath located on the outer surface of the insulation outer layer,
wherein the insulation inner layer is substantially an ethylene based copolymer,
wherein the insulation outer layer consists of a crosslinked thermoplastic polyurethane formed by crosslinking a resin consisting of polyurethane;
wherein an arithmetic average roughness (Ra) for the outer surface of the insulation outer layer is: 5.1 μm≤Ra≤98.5μm,
wherein a gel fraction of the insulation inner layer is: 51%≤gel fraction of insulation inner layer≤90%, and
wherein a gel fraction of the insulation outer layer is between 55% and 71% inclusive.

6. The cable of claim 5, wherein the ethylene based copolymer is an ethylene vinyl acetate copolymer, and wherein the insulation inner layer includes approximately 0.2 parts by mass of an antioxidant, and approximately 0.2 parts by mass of a copper inhibitor.

7. The cable of claim 5, further comprising:
an electrode terminal contacting an exposed end of the conductor, and
the resin molded body covering the electrode terminal, the exposed end of the conductor, and a portion of the outer surface of the insulation outer layer.

8. The cable of claim 7, wherein the resin molded body does not cover any portion of the sheath.

9. The cable of claim 5, further comprising:
an electrode terminal contacting an exposed end of the conductor; and
the resin molded body covering the electrode terminal, the exposed end of the conductor, and a portion of the outer surface of the insulation outer layer,
wherein the resin molded body does not cover any portion of the sheath,
wherein the ethylene based copolymer is an ethylene vinyl acetate copolymer,
wherein the insulation inner layer includes approximately 0.2 parts by mass of an antioxidant, and approximately 0.2 parts by mass of a copper inhibitor,
wherein the arithmetic average roughness (Ra) for the outer surface of the insulation outer layer is: $24.3\mu m \leq Ra \leq 66.2\ \mu m$,
wherein the gel fraction of the insulation inner layer is: 80%≤gel fraction of insulation inner layer≤84%, and
wherein the gel fraction of the insulation outer layer is: 58%≤gel fraction of insulation outer layer≤59%.

10. A molded cable comprising:
a conductor;
an insulation inner layer that comprises a crosslinked ethylene resin composition and that is provided directly onto an outer circumference of the conductor;
an insulation outer layer consisting of a crosslinked thermoplastic polyurethane wherein the insulation outer layer is positioned on an outer circumference of the insulation inner layer, wherein an arithmetic average roughness (Ra) of a surface of the insulation outer layer is 5 μm to 100 μm inclusive; inclusive and a gel fraction of the insulation outer layer is between 55% and 71% inclusive,
a resin molded body that coats an exposed end portion of the conductor and an end portion of the insulation outer layer at a side of the exposed end portion of the conductor and that is fused to the surface of the insulation outer layer, wherein the resin molded body comprises polyamide resin or polybutylene terephthalate resin;
and
wherein the crosslinked thermoplastic polyurethane is formed by crosslinking a resin consisting of polyurethane.

11. The molded cable of claim 10, wherein the resin molded body further comprises glass fiber to reinforce the resin molded body.

* * * * *